United States Patent Office 3,608,175
Patented Sept. 28, 1971

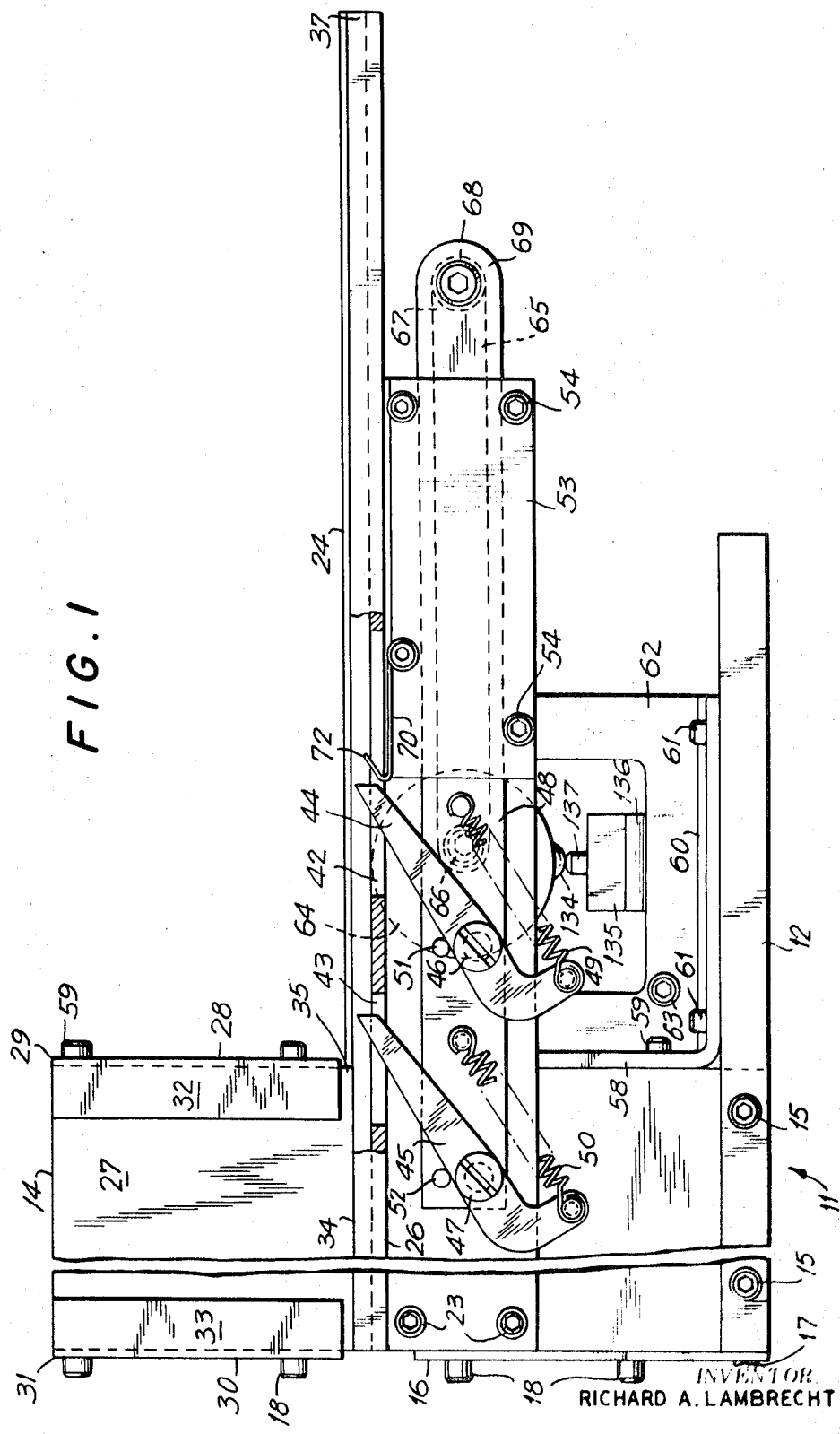

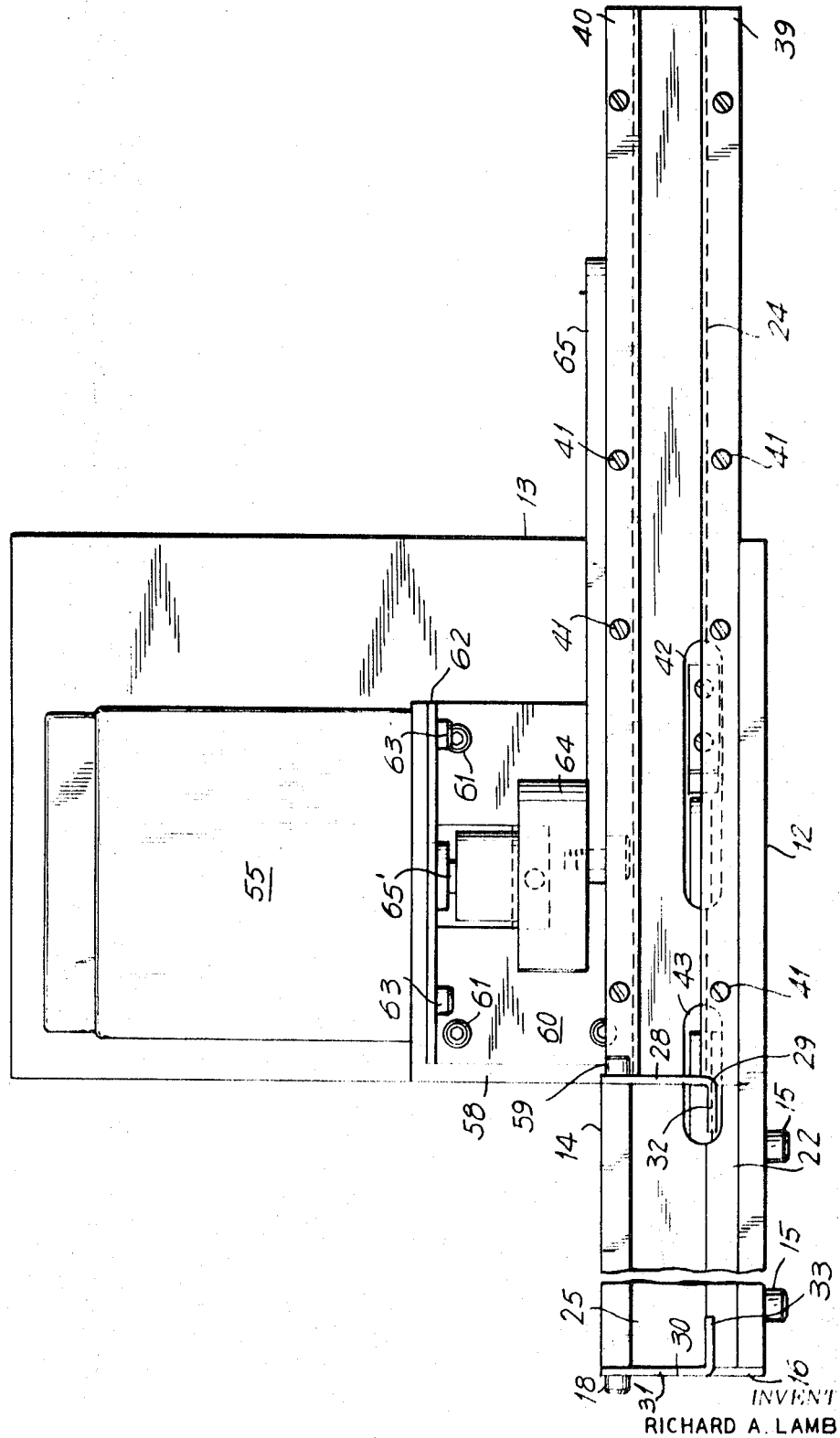

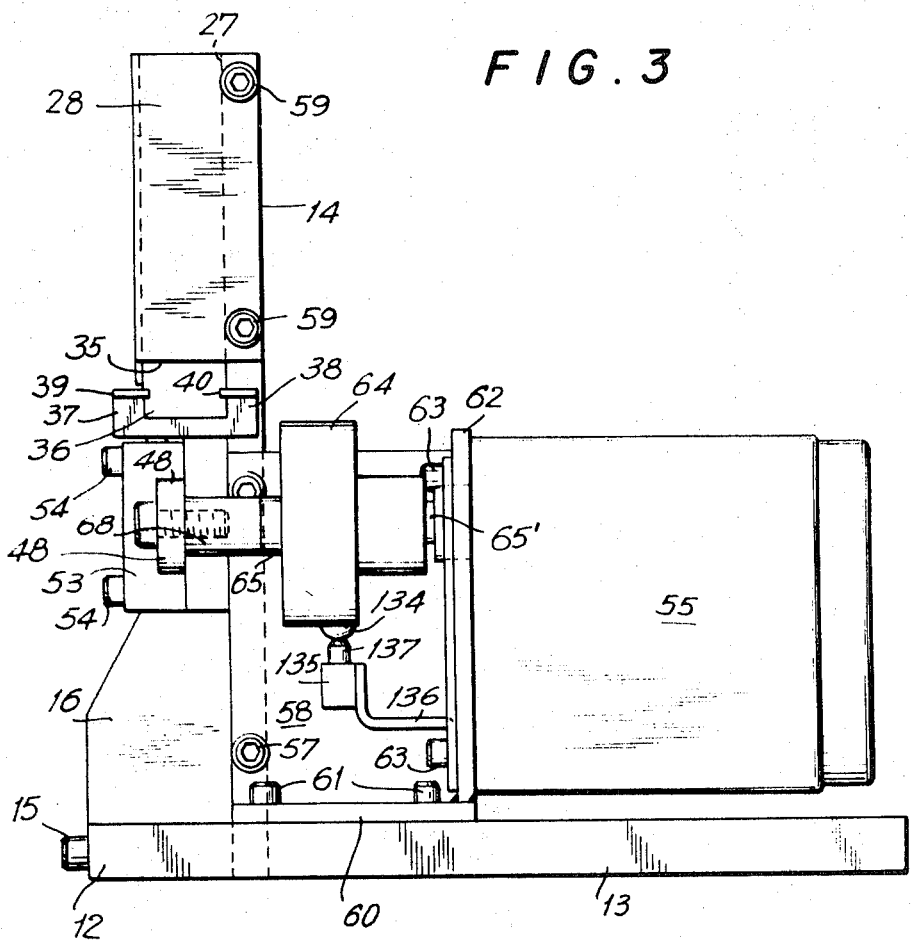

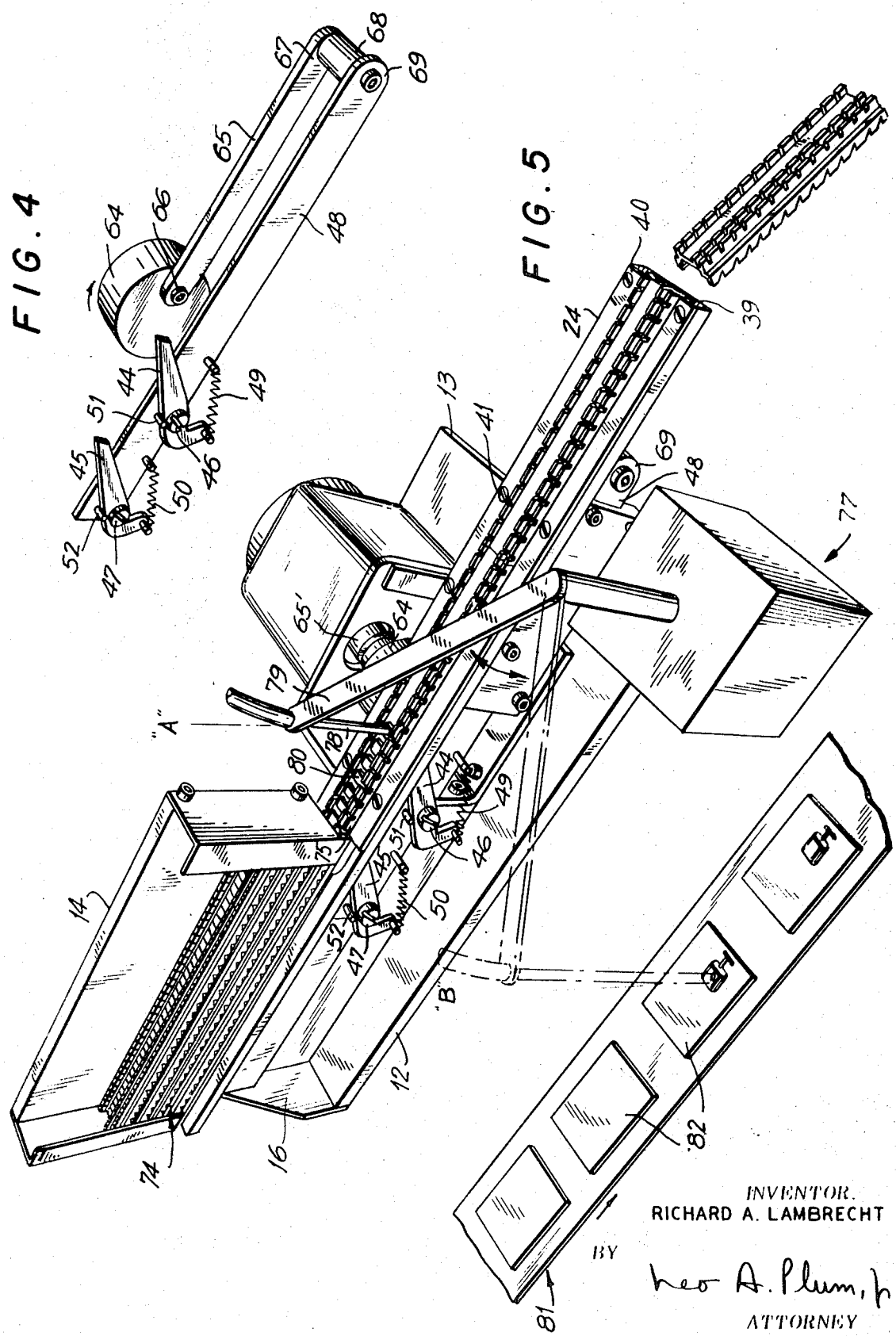

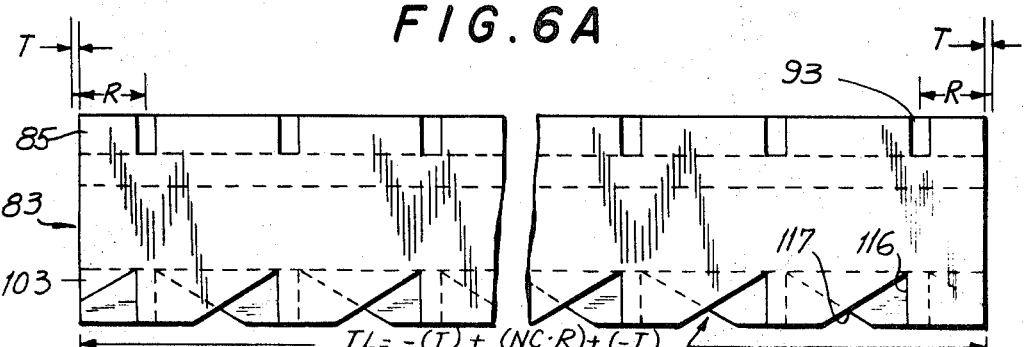
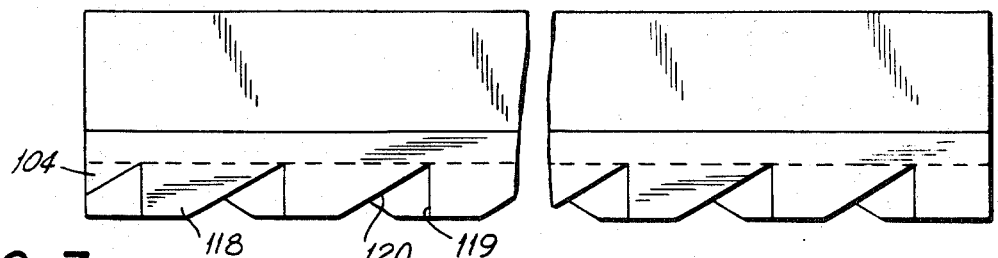
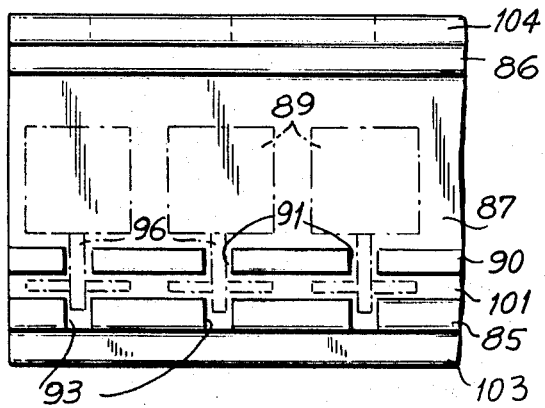
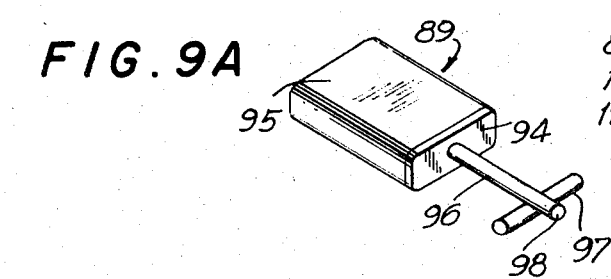
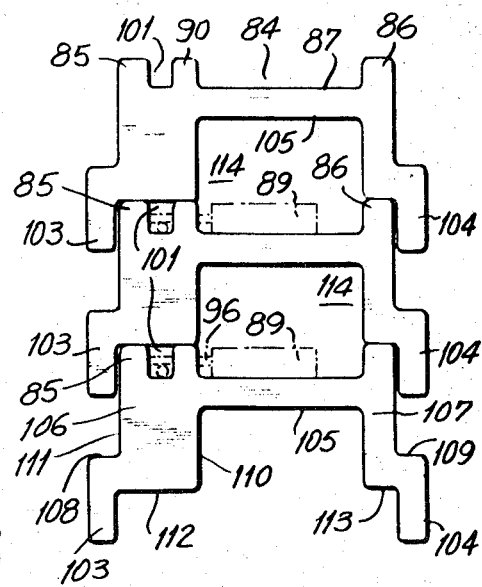
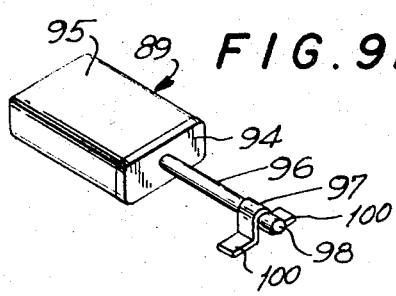
INVENTOR.
RICHARD A. LAMBRECHT
ATTORNEY

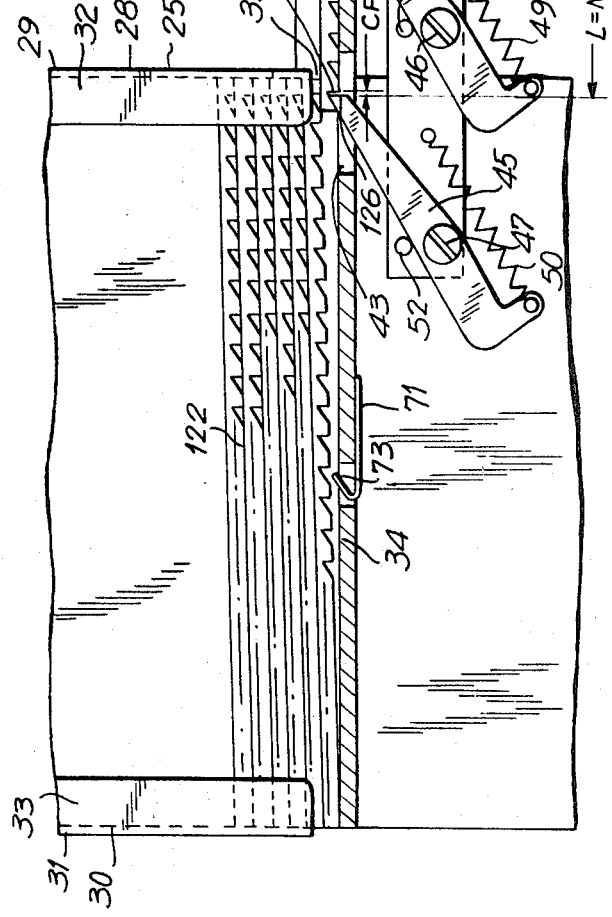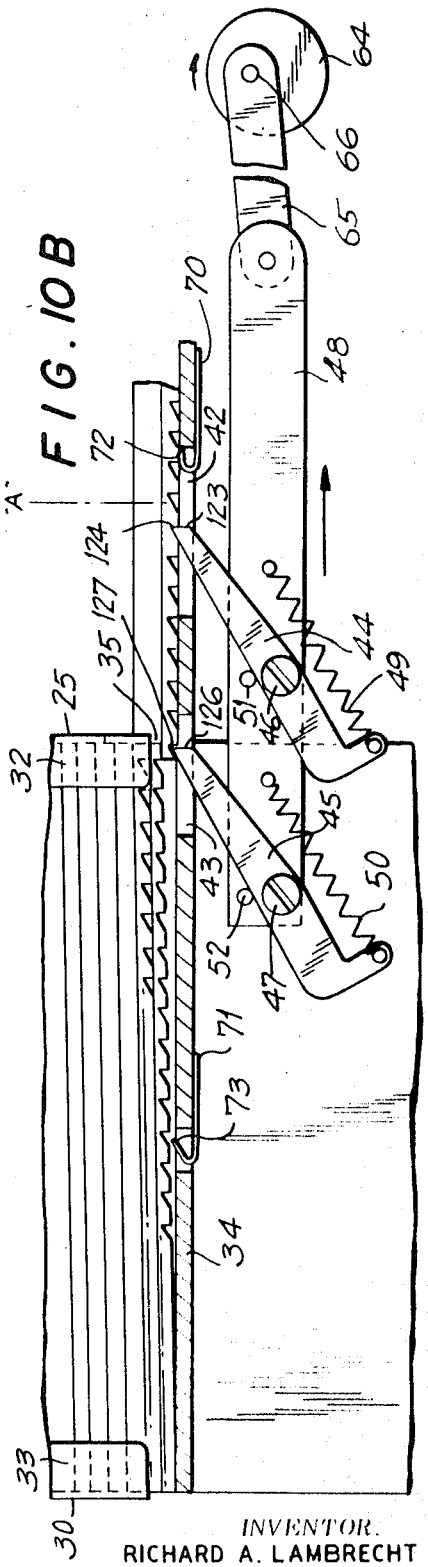

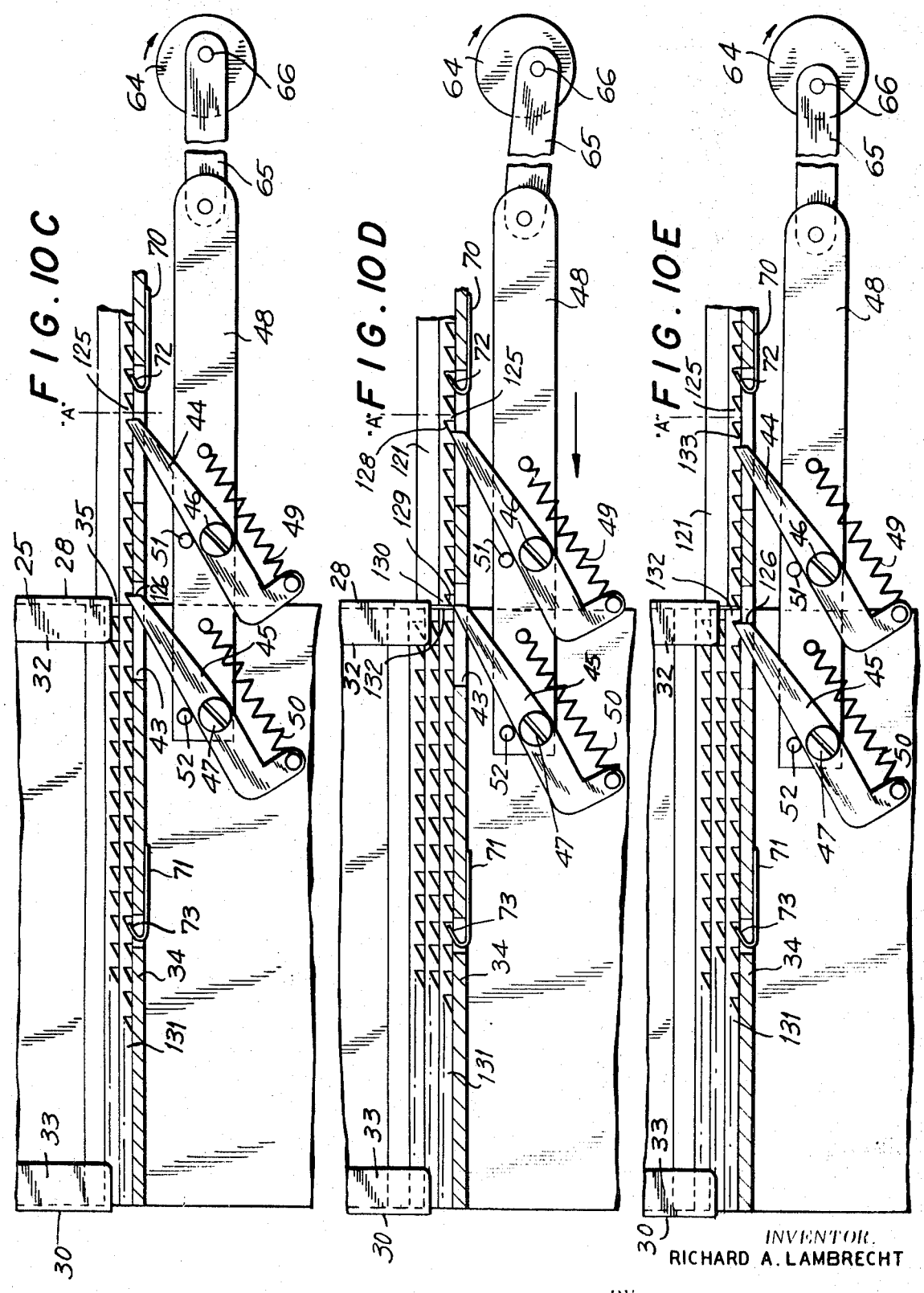

3,608,175
SYSTEM FOR THE STORAGE, TRANSPORTATION AND FEEDING OF ELECTRONIC COMPONENTS
Richard A. Lambrecht, Greenville, S.C., assignor to Union Carbide Corporation, New York, N.Y.
Filed Dec. 29, 1969, Ser. No. 888,436
Int. Cl. H05k 13/04
U.S. Cl. 29—203B
18 Claims

ABSTRACT OF THE DISCLOSURE

System for storage, transportation and feeding of electronic components onto hybrid circuit substrates including apparatus consisting of component carrying trays and tray handling apparatus, said trays having component holding means spaced along one surface thereof and a series of teeth spaced along the tray in predetermined relationship with the component holding means on the tray, said tray handling apparatus consisting of an open-bottomed magazine for containing a stacked plurality of said trays, a track extending from said magazine to a tray unloading station, a first tray progressing means operative to slidably actuate the lowermost tray out of the magazine, a second tray progressing means located between the magazine and the unloading station, said second tray progressing means operative to engage teeth on the tray for moving said tray intermittently along the track in increments equal to the spacing between the components on the tray and to position said components seriatim at the unloading station, and drive means for operating the two tray progressing means in synchronization with each other.

---

This invention relates to apparatus for transporting, indexing and unloading trays for handling parts such as electronic components, and to a tray specially adapted for cooperation with such an apparatus.

The automatic assembly of electronic components into a circuit structure, such as the assembling of one or more of such components onto each of a succession of hybrid circuit structures, generally requires the continuous and accurate feeding of the components to an assembly station. In the case of fragile electronic components the storage and transportation of such devices is desirably accomplished by the use of compartmented trays or carrying strips.

Such trays can be used in conjunction with tray handling apparatus wherein a plurality of trays are fed into the apparatus which has means for intermittently moving a tray past an unloading station, for holding the tray at the unloading station while the components are automatically removed from successive compartments in the tray, and for moving another tray into position after the first tray has been emptied. The unloading means may comprise a vacuum probe or a component gripping mechanism which automatically moves at equally spaced time intervals, or upon command, between the component unloading station, where it removes a component from the tray compartment, to a device assembly station, where the mechanism deposits the component. It is necessary that the tray handling system operate to continually position a component-containing compartment of the tray at the tray unloading station in exact sequence with the visit of the component removing mechanism to that point. This generally requires that the spacing between components in a tray, as well as between the last component in one tray and the first component in the following tray, be exactly equal. The trays however are often intended to be discarded after a single use, and it is therefore generally necessary that they be inexpensive. While inexpensive, discardable plastic trays can generally be formed by extrusion or pressure molding, it is difficult to so provide trays having the dimensional accuracy necessary to meet the stringent indexing requirements of ordinary tray handling apparatus. It is generally necessary therefore to provide tray handling apparatus which is adapted to automatically register the emptying of the last compartment of the tray in use, and then to specially move the first compartment of the succeeding tray the required distance to the unloading station, e.g. at a faster rate of speed so as not to change the required progression between components on the two trays. Complex apparatus of this type is cumbersome, occupying space at a possibly already cluttered assembly station. Such apparatus is also subject to breakdown since it often must perform compartment counting operations or employ micro-switches to actuate the tray switching mechanism when a tray is emptied. It would be desirable to have available a system of component carrying trays and tray handling apparatus which: first, would allow the use of inexpensively formed trays; and second, which would employ a tray handling apparatus capable of delivering, successively, a plurality of such trays to the tray unloading station in accurate synchronization with the operation of a tray unloading mechanism, which tray handling apparatus would be free of the need for complex additional equipment for recognizing the emptying of one tray and for actuating mechanisms for speeding up or slowing down the next tray.

It is an object of this invention therefore to provide a system for transporting a plurality of components and then continuously feeding individual components to a work station at accurately spaced intervals, said system consisting of component carrying trays which need not be formed with the same accuracy as required in the feeding operation, and a tray handling apparatus which will continuously handle a plurality of trays of such varying dimensional accuracy.

It is another object of this invention to provide a component carrying tray for use in an automatic tray handling apparatus, which tray is particularly suited for the storage, transportation and feeding of delicate electronic components of the unencapsulated solid electrolytic capacitor type.

Other aims and advantages of this invention will be apparent from the following description, the appended claims and the attached drawings.

SUMMARY OF THE INVENTION

In accordance with these objects, an invention is provided including the combination of a tray and tray handling apparatus, said tray having component holding means spaced along one surface thereof, a series of teeth spaced along said tray in predetermined relationship with the component holding means on the tray, said tray handling apparatus consisting of an open-bottomed magazine for containing a stacked plurality of said trays, a track extending from said magazine to a component unloading station, a first tray progressing means adjacent the magazine in a position to engage teeth of the lowermost tray in the magazine and operative to slidably actuate the lowermost tray out of the magazine and to move the tray intermittently along the track in increments equal to the spacing between the components held on the tray, a second tray progressing means located between the magazine and the unloading station at less than a tray's length distance from the first tray progressing means, said second tray progressing means also operative to engage teeth on a tray for moving said tray intermittently along the track in increments equal to the spacing between the components held on the tray and to position said components seriatim at said unloading station, and drive means for operating said first and second tray tooth engaging means in synchronization with each other. More particularly the second tray progressing means is adapted to engage a tooth on a tray prior to the engagement by the first tray progressing means on a tooth on a tray whereby the two tray 100 progressing means will not bind when both are acting on a single tray. Extreme accuracy in indexing the components at the component removal station is achieved by having the second tray progressing means position a component at the component removal station by the engagement of the tooth on the tray corresponding in position to that particular component.

The invention also includes a tray for holding a row of spaced-apart components consisting of an elongated structure, having an upper, open-topped channel extending longitudinally in one surface of the structure, a component positioning member extending along the floor of the upper channel near one side wall thereof and having notches evenly spaced along its length for receiving the leads of a row of components to be held in said upper channel, and a lower, open-bottomed channel extending longitudinally in the opposite surface of the structure with the floor of the upper channel forming a portion of the roof of the lower channel, said lower channel having a width between its lowermost faces slightly greater than the width between the outer faces of the upper channel whereby a plurality of such trays may be stacked in a nesting position with the adjacent floor portions spaced apart to define a plurality of closed chambers between adjacent trays, and a plurality of teeth being formed in at least one side wall of the lower channel, there being a one to one correspondence between said teeth and the notches on the floor of the upper channel. More particularly the trays are formed to have a length less than the product of the number of components to be held on a tray times the progression, or spacing between components, whereby inexpensively formed trays of variable dimensions less than an easily specified maximum length may be used without affecting the accuracy of the component feeding operation.

The invention also includes a system for storage, transportation and feeding of unsymmetrical electronic components onto hybrid circuit substrates having predetermined printed metal land patterns thereon for receiving the leads of the component, said components having T-shaped anode leads extending from unencapsulated solid electrolytic capacitor bodies, said system consisting of the combination of elongated component handling trays having component holding means spaced along one surface thereof to hold a plurality of said components with the cross bars of the T-shaped leads all arranged in a line extending axially of the tray and near one side wall thereof, and a series of teeth spaced along the length of the tray in a one to one correspondence with the components held thereon; tray handling apparatus consisting of an open-bottomed magazine containing a stacked plurality of such trays, a track extending from said magazine to a component unloading station, tray progressing means operative to engage teeth on a tray to slidably actuate the lowermost tray out of the magazine and then to progress the tray intermittently along the track in increments equal to the spacing between the components held on the tray and to position said components seriatim at said unloading station; means for progressing a plurality of hybrid circuit substrates to position said substrates seriatim at an assembly station with the component receiving lands arranged in a predetermined orientation; and component transferring means for removing a component from a tray at the unloading station and for depositing said component onto the hybrid circuit in synchronization with the positioning of said hybrid circuit substrate at the assembly station and with the T-shaped lead of the component on one land and the body of the component on another land.

In the drawings:

FIG. 1 is an elevational view of component handling apparatus according to the present invention;

FIG. 2 is a plan view of the apparatus of FIG. 1;

FIG. 3 is a side view of the apparatus of FIG. 1, viewed from the right;

FIG. 4 is a perspective view of elements of the driving mechanism of the apparatus;

FIG. 5 is a perspective, schematic view of the component delivering system of this invention including the tray handling apparatus, tray unloading mechanism and adjacent component assembly station;

FIG. 6-A is a front elevational view broken at midpoint of a tray according to the present invention; and 6-B is a rear elevational view of the same tray;

FIG. 7 is a fragmentary plan view of the tray of FIG. 6, now shown holding a row of electrolytic capacitor components;

FIG. 8 is a side view of a plurality of stacked trays of the type shown in FIG. 6, shown with components carried in the trays and chambers formed by stacking of the trays;

FIGS. 9-A and 9-B are perspective views of unencapsulated electrolytic capacitor components of types advantageously carried in the tray of this invention;

FIGS. 10-A to 10-E are sectional elevational views showing the operation of the mechanism for removing trays from the magazine and for indexing the components at the unloading station.

DESCRIPTION OF THE PREFERRED EMBODIMENTS

Referring to FIGS. 1 to 3, there is shown tray handling apparatus including a horizontal base 11 which may consist of an elongated flat member 12 with a laterally extending portion 13. An upright support member 14 consisting of a rectangular plate is connected to the base, as by bolts 15 extending through the plate near its base and into the rear side of the elongated portion 12 of the base. A bracing member 16 may be connected to both the base 11 and the upright support 14 as by bolts 17 into the left end face of the base and by bolts 18 into the left end face of the support member.

An elongated right angle member 20 having a vertical leg 21 and a longer horizontal leg 22 is arranged with its left end flush with the left end of the upright support member 14 and connected thereto as by bolts 23 extending through the vertical leg 21 into the front face of the upright support 14. The horizontal leg 22 of the right angle member is thus supported parallel to the base 11 and extends forwardly past the right end of the base. This horizontal leg 22 forms the track 24 upon which the component carrying trays are fed and transported to a device unloading station.

A tray magazine 25 is positioned over the left end 26 of the track 24. The tray magazine consists of a chamber having as its back wall 27 an extension of the upright support member 14. The forward front wall of the magazine is formed by a leg 28 of a right angle member 29 affixed to the right side of the wall 27. The rear end wall of the magazine is formed by the vertical leg 30 of another right angle member 31 affixed to the left side of the wall 27. The front of the magazine is partially closed by the legs 32 and 33 of the two right angle members. The cross section of the so-formed rectangular magazine chamber is made to be slightly greater in dimensions than the length and width of the component carrying trays which will be carried in the magazine. The height of the magazine is such as to accommodate a desired number of stacked trays. The top of the magazine is open for receiving a vertical stack of trays. The base 34 of the magazine is conveniently formed by the left end portion 26 of the track 24. Trays are fed from the bottom of the stack through aperture 35 in the base of the forward end wall 28. The height of the aperture 35 is slightly greater than the vertical height of an individual tray whereby only the bottommost tray in the magazine stack can exit from the magazine onto the forward position of the track.

A pathway for slidable transport of the trays along the track 24 is provided by an elongated channel 36 in the surface of the track. The width of the channel between its side walls 37 and 38 is just slightly greater than the widest portion of a tray. The rearward portion of the far side wall 38 may be cut away so as to allow the base of back wall 27 of the magazine to form the side wall of the channel in that portion 26 of the track which serves as the bottom of the magazine. Rails 39 and 40 are attached to the top of the side walls 37 and 38 as by bolts 41 in the forward portion of the track, i.e., forward of the aperture 35 in the front wall 28 of the magazine. These rails 39 and 40 overhang the channel floor portion of the track at an elevation over said floor corresponding to the height of elongated ridges or shoulders in the side walls of the trays (as shown in FIG. 8) whereby the trays can be slidably transported along the track 24 while vertical and lateral movement of the tray is confined by the rails 39 and 40 until the trays are propelled off the extreme right end of the track after all of the components thereon have been removed.

The track 24 is apertured at 42 and again at 43 to allow passage therethrough of two tray progressing pawls 44 and 45. These pawls are pivotally mounted at 46 and 47 on horizontally reciprocating shuttle bar 48. Spring means 49 and 50 act to bias the pawls upward through the apertures for engagement with teeth on the underside of the trays. Restraining pins 51 and 52 serve to limit the upward movement of the pawls under the action of the springs 49 and 50 so that the pawls rise no higher than the depth of the teeth on the trays.

The shuttle bar 48 is arranged for horizontal reciprocating movement through the stationary block 53 which is mounted on the vertical leg 21 of the angle member, as by bolts 54.

Reciprocating motion can be imported to the shuttle bar 48 in a number of ways. In the embodiment illustrated, specifically FIGS. 4 and 5, an electric motor 55 is shown connected to an upright support member 56 by bolts 57. The upright support, as shown in FIGS. 1 to 3, can be formed of a three-sided corner member having a vertical side 58 connected to the right end face of the upright support 14 as by bolts 59 and having a horizontal leg 60 connected to the base member 13 by bolts 61. The corner member has a vertical rear wall 62 and it is to the back of this vertical plate 62 that the electric motor is connected as by bolts 63 so that the motor is held over the lateral extension 13 of the base 11, thus distributing the weight of the apparatus over the whole of the base. As shown in FIGS. 3 and 4, a wheel 64 is mounted on the shaft 65 of the motor 55 which extends through an opening in the rear wall of the support member 62. A bell crank 65 is connected at 66 eccentrically of the center of the wheel. The opposite end 67 of the bell crank is connected to a linkage member 68. The end 69 of the shuttle bar is pivotally connected to the opposite side of this linkage member. The rotary motion of the motor shaft 65 and attached wheel 64 is translated by the eccentrically connected bell crank 65 and linkage 68 into a horizontal reciprocating movement of the shuttle bar 48. As shown in the drawings, one revolution of the motor shaft causes one cycle of the tray progressing and indexing mechanism. This cycle of reciprocation is composed of a forward and rearward motion. In the forward portion of this cycle, the shuttle bar 48 and attached tray engaging pawls 44 and 45 are moved in the forward direction a distance equal to the spacing of components on a tray, this distance being referred to as the progression and designated by the symbol (R). The forward movement of the rearward pawl 45 serves to move the bottom-most tray from the magazine 25 and through the aperture 35 onto the track 24. During the same interval of forward motion, the forward pawl 44 is advancing the tray and the next component to be removed therefrom to the center line of a component removal station, which is shown in FIG. 1 by the symbol A, and which will be explained further hereinafter.

In the rearward portion of the cycle of reciprocation, both pawls are disengaged from the teeth on the trays and are moved rearwards, i.e. in the direction from the component removal station (A) toward the magazine 25, a distance again equal to the spacing of the components on the tray. The pawls 44 and 45 are then in positions to engage new teeth on the tray which are rearward of the teeth previously engaged so as to propel the tray forward along the track 24 on the next forward movement of the shuttle bar 48. In order that the trays will not slide backwards during the rearward motion of the pawls 44 and 45, detention means 70 and 71 are provided. Detention means 70 is situated just forward of the component removing station (A) and detention means 71 is situated in the base 34 of the magazine 25. These detention means can comprise spring bent clips having projections 72 and 73 designed to abut against a face of the teeth on the tray to prevent movement of the tray in the rearward direction. The clips are flexible allowing substantially unimpeded movement of the tray teeth in a forward direction over the projections 72 and 73.

The placement of the tray handling apparatus relative to the component removal station and the operation thereof can be seen by reference to FIG. 5. As shown there, a stack of trays 74 is held in the magazine 25 and the bottom-most tray 75 is dispensed from the magazine along the track 24. The tray 75 is transported intermittently along the track in increments corresponding to the spacing between the components 76 on the tray. The tray transporting means, not shown here, progresses the tray to position or index the components one at a time at an unloading station A. At this station a component pick-up mechanism 77, including for example a vacuum operated probe 78 mounted on swinging arm 79 is lowered at position A to contact and then lift a component 80 from the tray 75. The arm 79 moves through an arc to next position the component-carrying vacuum probe 78 (as shown by the dotted lines) at an unloading, or assembly station B overlying, for example, a moving line 81 of hybrid circuit substrates. A hybrid circuit structure may comprise a substrate having a predetermined electrical circuit formed thereon as a pattern of conductive strips or printings. Various circuit components such as unencapsulated capacitors are deposited on appropriate lands of the circuit pattern and thereafter soldered or otherwise connected in place. These substrates are moved intermittently to position the substrates one at a time at position B in synchronization with the movement of the arm 79 to that point, whereupon the arm and vacuum probe 78 are lowered and the component 80 unloaded onto the hybrid circuit structure 82. The arm 79 and vacuum probe 78 are then raised and returned to position A, at which point the tray progressing mechanism has now placed the next component. The cycle is repeated to continue unloading components from the trays and to deposit these components onto each of a continuously fed line of substrates in an automatic production line operation, requiring only the stacking of additional trays in the magazine and the supplying of additional substrates as needed.

If desired, an arrangement may be made whereby the components are tested for electrical characteristics while still on the tray and prior to being positioned at the unloading station A. The testing means can consist of an appropriate probe type testing device situated adjacent the track between the magazine opening and station A. If a defective component is found, the testing means can be arranged to generate a signal to actuate the component removing means to lift that particular component from the tray and to discard it, as by having the vacuum probe and swinging arm rotate in an other direction than that shown in FIG. 5 to drop the defective component in a reject bin; or alternatively the defective component can be left in the tray, by-passed and discarded with the tray after all of the nondefective components are removed therefrom. At the same time, the generated signal can operate to halt the motion of the moving line of substrates and to hold the substrate at station B until the next nondefective component is positioned at station A and then deposited on the waiting substrate. The substrate moving operation can then be started again.

The structure of the trays may be seen by reference to FIGS. 6 to 8. As shown there, the component carrying tray 83 of this invention is an elongated structure having an open-topped channel 89 extending longitudinally in its upper surface. This channel is formed by longitudinal side walls 85 and 86, and floor member 87. Components 89 (shown in dotted lines) are spaced horizontally along the floor 87 of the channel at intervals determined by a component positioning member 90 consisting of a slotted wall which extends along the floor of the channel near the side wall 85. This member 90 has slots 91 spaced along its length to receive the leads of the components to be carried in the tray. The centerlines of the slots are spaced apart a distance equal to the desired progression.

The slots 91 may be formed when the tray is molded so that the member 90 is made up of a series of spaced apart longitudinally extending ribs, with the spaces therebetween forming the slots. The tray may also be formed with a continuously extending wall 90 and slots 91 cut into this wall in a subsequent operation. In such a cutting operation, it may be convenient to allow the cut to go through side wall 85 as well, thereby forming a series of slots 93 in this wall opposite the slots in the member 90. The slots 93 may also have a function in holding the components, as seen below. The trays of this invention are particularly suitable for the storage, transportation and dispensing of unencapsulated solid electrolytic capacitors, two types of which are shown in FIGS. 9–A and B, and a plurality of which are shown arranged in a tray in FIG. 7. These capacitors 89 have a body 94 which is composed of a porous tantalum anode pellet having thereon successive coatings consisting of an oxide film, a solid impregnated manganese dioxide coating, a carbon coating and a metallic coating covering the carbon coating consisting of a thin metal layer and finally an outer solder coating 95. As shown in FIG. 9–A, a short tantalum lead wire 96 extends from the capacitor body 94 and a short strip or bar 97 of a weldable and solderable metal, e.g. nickel, is welded across the wire near its end in a T-configuration. A short stub 98 of the tantalum wire may extend past the nickel cross bar 97.

In FIG. 9–B, the cross-strip 97 has been bent downwards on either side of the lead wire 96 to form two feet 100 which are at the same level as the base of the anode pellet 94. When the capacitor is laid down the base of the capacitor 94 and the feet 100 will be approximately in the same plane. Such capacitor components are often left unencapsulated when they are intended for use in hybrid circuit structures. Since the unencapsulated capacitor components herein described may be manufactured in one location while the hybrid circuit structures may be assembled at another, it is advantageous to have a reliable means for transporting, storing, and dispensing the fragile and easily damaged capacitor components. These functions are all provided by the tray of this invention wherein a plurality of such capacitors are inserted in the open-topped channel 84 with their lead wires 96 extending through the slots 91 in the component positioning member 90 and with the nickel cross bars 97 situated in the space 101 between the side wall 85 and the slotted wall member 90. The slots 91 and the space 101 between the side wall 85 and the slotted wall 90 are made narrow enough, in relation to the size of the lead wire 97 and the width of the cross bars 97, to substantially immobilize the capacitors from further movement in any lateral direction, i.e. in the plane of the channel floor 87. The size of these openings should not be so narrow however as to interfere with the vertical removal of the component from the tray.

The side wall 85 may also have slots 93 at intervals along its length opposite the position of the slots 91 in positioning member 90 in order to receive the stubs 98, if any, of the capacitor lead wires 96. This arrangement allows the width of the space 101 between the side wall 85 and the positioning member 90 to be made narrow enough to closely confine the cross bars 97. The width of the wall 90 should be such as to allow clearance between the face of this wall and the body 94 of the capacitor 89. Thus when the capacitor has been inserted from above into the channel 84 with a lead wire 96 in a slot 91 and with the crossbar 97 held in the space 101, the capacitor body 94 with its fragile exposed coatings 95 will be held in a stand-off position from the wall 90 and will not be subject to any abrading as might result if the body 94 were allowed to contact this wall 90. The cross bar 97 will lie on the floor of the space 101. The width of this space 101 should not be so small, in relation to the width and shape of the cross bar 97, as to confine the vertical movement of the component.

Vertical movement of the capacitors during storage and transport is substantially restrained by the stacking arrangement of the trays. Referring to FIGS. 7 and 8, a second channel 102 is formed in the opposite surface of the elongated tray structure. This channel is open-bottomed and is formed by lower side walls 103 and 104. In order that trays may be stacked one upon the other in a nesting relationship, the width of the bottom opening of the channel 102 between the inside faces of side walls 103 and 104 is made slightly greater than the width between the outside faces of the upper side walls 85 and 86 of the open-topped channel 84. The lower channel 102 is connected to the upper channel 84 by means of a partition therebetween extending the length of the tray. In this partition, a central portion serves as the floor 87 of the upper channel 84 as well as the roof 105 of the lower channel 102. Intermediate wall members 106 and 107 and associated shoulder portions 108 and 109 connect the more widely spaced apart lower side walls 103 and 104 of the lower channel 102 to the narrower side walls 85 and 86 of the upper channel 84. Intermediate wall member 107 is an extension of upper side wall 86 while intermediate wall member 106 has an inner face 110 which is coplanar with the inner face of the slotted wall member 90 in the upper channel, and an outer face 111 which is coplanar with the outer face of the side wall 85 of the upper channel. The intermediate member 106 and associated shoulder portion 108 is thus thicker than the opposite intermediate member 107 and associated shoulder portion 109. The bases 112 and 113 of the shoulder portions 108 and 109 are coplanar and are parallel to the floor members 87 and 105. When trays are stacked one upon the other, as shown in FIG. 8, the lower side walls 103 and 104 of the lower, open-bottomed channel 102 fit over the side walls 85 and 86 of the upper channel 84 in a nesting relationship, and the bases 112 and 113 of the shoulder members 108 and 109 rest on the top faces of upper side walls 85 and 86. Additionally the height of the slotted component positioning member 90 is made equal to the height of the upper side walls 85 and 86 whereby, when nested, the base 112 of the upper tray in the stack will rest on the upper face of the slotted wall member 90 closing off the slot openings 91 and preventing the escape of the cross bars 97 and lead wires 96 of the capacitors 89 from the space between the side wall 85 and the slotted member 90. The capacitors are thus safely contained in the chambers 114 formed between the stacked trays and are prevented not only from falling out of the stacked trays, but are substantially immobilized from vertical movement which might damage the fragile coatings making up the capacitor. Since the chambers 114 are formed by the mating open topped upper channels 84 and open-bottom lower channels 102, the heights of the chambers 114 are thus greater than the heights of the upper side walls 85 and 86. Capacitors having a vertical profile higher than shown in FIG. 8 may thus be carried on the trays. The chambers 114 between stacked trays are enclosed on all sides except at the ends and a completely sealed unit consisting of a plurality of stacked trays may be made by wrapping the stack in an envelope of plastic film which can then be shrunk fit and the stack sealed.

The trays may be removed from or added to either the top or bottom of a stack by vertical movement. The trays in a stack may also be slidably moved relative to each other since the top surfaces of one tray, i.e. the top faces of the side walls 85 and 86 and the slotted wall 90 only slidably contact the bottom surfaces of the next higher tray, i.e. the bases 112 and 113, and do not immovably interlock therewith.

Once a tray has been removed from the bottom of the stack and slid out of the magazine onto the track, there is no longer any restraint on the possible movement of the component in the upwards direction. While such components are still restrained from substantial movement in a lateral sense, i.e. in the plane of the tray floor, they are free to be easily lifted out of the tray by the vacuum probe at the unloading station. It is important that the width of the slot openings and the width of the space between the slotted wall and the side wall be sufficiently greater than the corresponding dimension of the T-shaped leads of the components to allow the swift and sure extraction of the components from the tray by the vacuum probe, even in the case where a component may be occasionally positioned slightly off-center from the unloading station due to slight errors in tray manufacture, component lead shape, etc. The size of the openings referred to above should be sufficient to allow removal of the component in such cases where the off-center contact of the vacuum probe on the component might cause the component to tip slightly with the danger that the T-shaped lead might catch or bind in the slot if the slot opening and the space between the slotted wall and the side wall are too narrow. By using the teachings set out herein, one skilled in the art should have no difficulties in selecting the dimensions, positioning and shape of the slotted wall member and its openings so as to allow the easy vertical removal of the component from this member while providing a substantial restraint on the lateral movement of the component. For example, the slot openings may be fashioned so as to be wider at the top of the opening and narrower at the bottom of the opening in a V-shape whereby removal of the components is easily accomplished.

As the trays are fed from the magazine by sliding the lowermost tray out through the aperture 35, as shown in FIG. 1, the bases of the side walls 103 and 104 will slide along the bottom of the track 24. The height of these walls 103 and 104 to the shoulder portions 108 and 109 is such as to just fit under the overhanging rails 39 and 40 which are found in the track 24. The width of the tray just above the shoulders 108 and 109 is slightly less than the distance between the rails 39 and 40 whereby the trays will be confined by the rails as they are progressed along the track and thereby accurately located thereon.

In order that the trays may be positively progressed along the track to accurately position the components at the unloading station, the lowermost portions of the side walls 103 are racheted in the form of a series of teeth 115 arranged in a one-to-one relationship with the components held on the tray, i.e., spaced at intervals corresponding to the spacing between component supporting notches 91 on the upper surface of the tray. The teeth each have a flat face portion 116 designed to receive a pushing motion from a pawl like projecting mechanism. The opposite portion 117 of each tooth slants in the rearward direction so as to allow the pawl to slide over this surface 117 in its backstroke motion. The angle of the notch formed by these surfaces 116 and 117 will be in the direction of the intended motion of the tray along the track.

The tray embodiments shown in the drawings are formed to specifically hold the unsymmetrical capacitors of FIGS. 8 and 9. The component positioning member 90 in the case shown, is formed closer to one side wall 85 than to the other side wall 86, so that the cross bars 97 of these capacitors may be held in the space 101 between the side wall 85 and the positioning member 90. As a result of this arrangement, when such trays are progressed along the track of the tray handling apparatus, the capacitor 89 will be presented to the component removal mechanism with the capacitor lead wire 96 and cross bar 97 oriented towards the right. In some cases, however, it may be desired to have the capacitors presented in the reverse orientation. While the trays could be formed so as to have another component positioning member near the side wall 86 whereby capacitors could be fed to the component removal mechanism with their lead wires facing towards the left, this would reduce the area of the channel space 84 available for holding components. It is another aspect of this invention therefore to have another set of ratchet teeth 118 formed in the opposite side wall 104. These teeth may be seen in FIG. 6–B to have their vertical faces 119 opposite a face 120 which slants towards the right of the tray so that the angle of the notch formed by the teeth 118 slants toward the left. By reversing the trays 83 in the magazine they can be made to be progressed through the tray handling apparatus with the component leads arranged all on the left side of the trays.

The operation of the apparatus may be understood by reference to FIGS. 10–A to 10–E wherein a full cycle of the tray progressing mechanism is represented. In FIG. 10–A there is shown a portion of the magazine 25, rearward portion 34 of the track which serves as the bottom of the magazine, and a part of the forward portion of the track 24 including the point A at which components are to be removed from the tray. Also shown are the apertures 42 and 43 in the track through which pawls 44 and 45 project. The shuttle bar 48 to which the pawls are pivotally attached at 46 and 47 is shown along with a representation of the bell crank 65 connected to the shuttle bar 48 through linkage 68 and itself pivotally connected at 66 eccentrically of the center of the wheel 64. The bell crank 65 and eccentrically connected wheel are shown schematically in a straightened manner for ease of illustration.

In FIG. 10–A a tray 121 is shown on the track 24 in the process of being ejected from the magazine through the aperture 35. The magazine contains a stack 122 of additional trays. The shuttle bar 48 is at its most rearward point of its reciprocating action as seen by the nine o'clock position of the bell crank and eccentric wheel. The nose 123 of the forward pawl 44 only is in contact with the vertical face 124 of a tray tooth 125. The nose 126 of the rearward pawl is seen to lag behind the vertical face 127 of the last tooth of the same tray 121. The spacing between the pawls is set to be a distance (L) equal to the product of (N) representing a whole number of teeth and the spacing between adjacent teeth (R) plus a clearance factor (CF) as below:

$$L = N \cdot R + CF$$

The reason for this relationship of the rearward and forward pawls will be appreciated as the motion of the shuttle bar mechanism is further explained. In FIG. 10–B it is seen that the wheel 64 has rotated ninety degrees in a clockwise direction to a twelve o'clock position. The shuttle bar is thereby moved in a forward direction a distance equal to one-half of its total forward movement, i.e. $R/2$. The forward pawl 44 has pushed the tray 121 by engaging the tooth 125 this same distance, R/2. The rearward pawl 45 is moved the same distance R/2 since it is connected to the shuttle bar 48. The rearward pawl 45 has not however engaged the vertical face 127 of the last tooth and the movement of the tray has been accomplished solely by the pushing action of the forward pawl 44.

In FIG. 10–C, the wheel 64 has further rotated an additional ninety degrees to the three o'clock position, its furthest forward position. The forward pawl 44 has now pushed the tray 121 by engagement of the tooth 125 so that the particular component in the tray (indicated as point 127 on the tray) which corresponds to the tooth 125 is now directly under the centerline of the component removal station A. Extreme accuracy in positioning the component under the centerline of the component removal station is accomplished by having only the forward pawl 44 actually engage a tooth of the tray during the forward motion of the shuttle bar. It is highly advantageous to have the tray propelled along the track and to have the components positioned seriatim at the component removing station by the pushing action of a pawl which positively engages a tooth on the tray rather than to have the tray pushed from behind, as by a ratchet projection on an end less chain or by a conveyor belt. The positive engagement of the pawl and tray teeth ensures that the movement of the tray will be unidirectional and complete and that no slippage will occur whereby the component might not be placed exactly at the component removal station with the result that the component pickup mechanism would miss that particular component and thus fail to place a component on the substrate already moved into position to receive the component. The failure of the mechanism to place the component on the substrate might not be noticed until after the substrate has been further processed at additional expense and at which time it would have to be rejected.

The placement of the forward pawl 44 at a point on the track just behind the component removal station A to engage the tooth on the tray which corresponds to the component on that tray to be removed therefrom further ensures that the component will be positioned accurately at the component removal station. This is so since the effects of any dimensional inaccuracies in the tray, and hence in the spacing between the components thereon, will be minimized because the component indexing pawl 44 is situated at the component removal station. The forward pawl acts on the tray tooth which corresponds to the component on the tray intended to be next positioned at the station; and since it is unlikely that there will be any large degree of dimensional inaccuracy between an individual tray tooth and its corresponding component on the tray, the effects of any inaccuracies in spacing of the teeth or components on the tray are thus minimized. Such would not be the case, however, if the tray were merely pushed into position from behind or if the rearward pawl 45 was allowed to index the components at the removal station, since the summation of many small inaccuracies in tooth or component spacings would thus be magnified resulting perhaps in a mispositioning of the components at the station. It is for this reason that the pawls 44 and 45 are arranged on the shuttle bar so that it is the forward pawl 44 which is first to contact a tooth on the tray. This is accomplished by having the spacing between the pawls, 44 and 45, set at a distance (L) which is greater by a clearance factor (CF) than a whole number (N) of progressions (R), or spacings between the components. The clearance factor (CF) need not be large and must be less than the amount of the spacing between the teeth.

Another advantage of having the distance between the pawls different than an exact multiple of the spacing of the teeth, is that there is no danger of the two pawls binding in the teeth of any one tray. This could occur if the distance between the pawls was in fact equal to or slightly less than the distance between the teeth at opposite ends of the tray which were engaged by the pawls. The clearance factor (CF) should thus be slightly greater than the tolerance which exists in production in regard to the spacing of the teeth on the tray. The amount of this tolerance will depend on the nature of the tray, its material of construction and the precision of its manufacture. The apparatus of this invention is ideally suited to operate with inexpensive, and hence somewhat imprecisely formed trays, and yet still function accurately.

The purpose of the rearward pawl 45 can now be seen by reference to FIG. 10–D. Assuming that the wheel 64 has paused at the position shown in FIG. 10–C so that the component can be removed therefrom, the wheel is then seen to have rotated clockwise an additional ninety degrees to a six o'clock position. The shuttle bar 48, acting under the influence of the now rearwardly moving bell crank 65, is itself reciprocated rearward a distance equal to one-half the progression, R/2. The pawls 44 and 45, being only resiliently biased upward by the springs 49 and 50 (not shown in FIG. 10 for simplicity, but shown in FIG. 1) are able to slide backwards over the slant faces 128 and 129 of the teeth 126 and 130, which were previously engaged by the pawls. The tray 121 is retained in the forward most position of FIG. 10–C due to the restraining action of the detention means 72. Since the tray is held stationary during this phase, the component removal operation can be timed to take place now. It is generally more convenient, however, to have the mechanism dwell at the position indicated in FIG. 10–C while the component is removed. This can be accomplished by having as the driving means 55 a servo motor which is programmed to stop and pause at this position. If desired means can be associated with the rotating wheel 64 for actuating the operation of the component removing mechanism when the component has been moved under the station A. For example, referring to FIG. 3, there is shown a knob 134 mounted on the wheel 64 and a micro-switch 135 mounted on a support 136 connected to the upright 62. When the wheel 69 has rotated to its three o'clock position and advanced the shuttle bar and pawls to their furthest forward position, the knob 139 will depress the button 137 of the micro-switch which can be arranged to actuate the picking up of the component and its transfer to the assembly station B.

As a result of the forward movement of the tray 121 as shown in FIGS. 10–A to 10–C, the last portion of this tray has been moved out of the magazine aperture 35. The tray 131, the next or lowermost tray in the magazine stack 122, is seen to have dropped to the track 34 in the base of the magazine as the forward edge of this tray 131 clears the rearward edge of the preceding tray 121. This occurs as the shuttle bar and forward pawl 44 are moved to the most forward position of FIG. 10–C. The tray 131 is already in position on the base of the magazine as the pawls are moved rearwardly in the back stroke phase of the cycle of reciprocation. When the shuttle bar and pawls 44 and 45 have reached the extreme rearward position as shown in FIG. 10–E, the nose of the rearward pawl 126 is in a position to engage the first tooth 132 on the tray 131. The forward pawl 44 is additionally in position to engage tooth 133 on the tray 121, the tooth 133 being the next tooth after the tooth 125 in the same tray previously acted upon in the forward phase of the cycle. As the wheel 64 continues its rotation from the nine o'clock position shown in FIG. 10–E to the three o'clock position of FIG. 10–C in a repetition of the cycle, the shuttle bar will again move forward. The forward pawl 44 will engage the tooth 133 on the tray 121 and progress the tray along the track to position the component on the tray corresponding to this tooth 133 at the component removal station A. The rearward pawl 45 will engage the first tooth 132 on the next tray 131 and move this tray out of the magazine a distance equal to one progression. In further repetitions of the cycle, the rearward pawl 45 will continue to progress the tray 131 along the track as the forward pawl 44 progresses the previous tray 121 past the component removal station.

When the last tooth in the tray 121 has been engaged by the forward pawl 44, and the last component removed therefrom, the next tray 131 will come under the influence of the forward pawl 44 as this pawl engages the first tooth 132 on this tray. At this time, because the spacing between the pawls 44 and 45 is greater than a whole number of progressions, only the forward pawl 44 will progress the tray 131 and index its contained components at the component removal station, thereby obtaining the accuracy of indexing described above. The rearward pawl 45, while continuing to reciprocate in the same cycle, will not positively engage a tray tooth until the tray 131 is removed from the magazine. The rearward pawl thus has the function only of moving trays out of the magazine and then along the track to a point where the forward pawl takes control of that tray and then, under its sole influence, indexes that tray at the component removal station.

In order that a tray just emerging from the magazine will not abut against or push the preceding tray, such as the possible pushing of tray 121 by tray 131 in FIG. 10-E, thereby tending to interfere with the positive indexing of tray 121 by the forward pawl at the component removal station A, the trays are made to be shorter in length than a whole number of progressions. For example, if a tray is to hold a stated number (NC) of components at a spacing or progression (R), the length of the tray (TL) should not be $NC \times R$, but should be $(NC \times R) - 2T$, where T is a small tolerance assigned to both ends of each tray to prevent binding of two adjacent trays on the track when they are each under the influence of separate pawls. This tolerance is necessary since the rearward pawl, while set to engage a tray tooth after the forward pawl, still moves forward a distance equal to the forward movement of the forward pawl. If one or more trays were imprecisely manufactured to be slightly greater in length than the distance $NC \times R$, or even precisely manufactured to be exactly this distance, there would be the danger that the two trays would touch since the distance from the last tooth on the first tray to the first tooth on the succeeding tray might be greater than the progression, resulting in a binding of the trays. By making the length of the trays less than the distance $NC \times R$, a slight spacing between adjacent trays will always be maintained and there will be no danger of binding. However, the distance between the last component in the first tray and the first component in the succeeding tray will still be maintained as the proper progression (R) and the accuracy of the indexing operation will not be affected since it is the forward pawl which indexes the trays at the component removal station. While a tray may be progressed out the magazine by the rearward pawl and along the track at varying spacing from the preceding tray, once the forward pawl takes control of that tray, the proper progression will be initiated and maintained to the point of the component removal station. Once a tray has been emptied of its components and is propelled by the forward pawl past the component removal station, it will be further progressed off the extreme right end of the track by the tray following. The slight rearward restraint of this pushing action on the tray being processed at the component removal station does not interfere with the accuracy of the indexing.

The provision of trays having a length less than the value of $NC \times R$ does not involve the need for as great a degree of manufacturing precision as the manufacture of a tray to an exact length equal to the number of its components times the spacing between components. This is because the length of the tray of this invention may be made with somewhat broad manufacturing specifications as long as it is less than the $NC \times R$ value. The limits on the length are thus quite wide and easily met in production. The mold in which the tray is produced can be made to have a length just equal to or slightly less than $NC \times R$ and the trays so produced will always be shorter than $NC \times R$. It would be much more difficult to produce a tray having a length exactly equal to the $NC \times R$ value.

As an example of a tray made according to the principles set out herein, reference is made to FIG. 6-A. The tray there has a length TL and a progression R. Assuming that the number of components (NC) to be held on such a tray is 50 and the spacing between components (R) is to be 0.25 inch, with the first and last components to be set back from the respective edges of the tray a distance which is normally one-half the spacing R, in this case the length (TL) of the tray would be as follows:

$$TL = \left(\frac{R}{2} - T\right) + (NC-1) \times R + \left(\frac{R}{2} - T\right)$$

or $$TL = (-T) + (NC \times R) + (-T)$$

where the two $(-T)$ factors represent the slight tolerance at each end of the tray to provide the clearance described above. If the tolerance (T) were selected as 0.100 inch, a suitable value, then the tray length would be $(0.125-0.01) + (49 \times 0.25) + (0.125-0.01)$ or, more simply, $(-0.01) + (50 \times 0.25) - (0.01)$ equal to 12.48 inches.

While the tray embodiments described herein are specifically suited for carrying the capacitor components shown in FIGS. 9-A and 9-B, it is to be understood that trays constructed in accordance with the principles of this invention can be adopted to carry other types of components. For example, components having one or more lead wires and of radial, axial or any other lead wire configuration could be held on these trays by suitable fashioning of a component positioning member. Additionally, compartments or component saddle members could be formed in the floor of the upper channel of the tray to hold various types of electrical components or other parts. It is only necessary that there be means to hold the components in a predetermined relationship to the ratchet teeth on the tray, i.e., with the centerline of each component in a predetermined relationship with some part of a tooth on the tray.

The system described herein is particularly suited for the storage, transportation and feeding of unsymmetrical components such as those shown in FIGS. 9-A and 9-B, onto hybrid circuit substrates. These hybrid substrates will have printed metal land patterns thereon for receiving the component, one land being intended for the T-shaped anode lead and another land for the unencapsulated body portion of the component. As can be seen by reference to FIG. 5, the substrates are delivered in a moving line to the assembly station B. The land pattern on the substrate can be oriented in a certain predetermined manner. The unsymmetrically-leaded capacitor components held on the trays may be arranged with the T-shaped anode leads disposed either towards or away from the adjacent line of substrates, merely by arranging the trays in the magazine with the T-shaped leads pointing in the desired direction. The components can therefore be delivered to the component removal station with the T-shaped lead best oriented for the mechanically least complicated transfer of the component onto the appropriate lands on the substrate. While the component removing and transfer device is shown supported on a swinging arm, it is understood that this mechanism can be arranged to move from station A to station B in any combination of translatory and/or rotational movements as may be necessary to properly orient the component for deposition on the appropriate lands. Additionally the vacuum probe itself may be adapted to rotate around its own axis. The need for such automatic movements of the component transfer mechanism is lessened however by the ability of the apparatus to deliver the unsymmetrical components at the unloading station A in either of two possible orientations.

The ratchet teeth on the tray may also be formed in other shapes and in other positions than that illustrated provided they are arranged as described herein to be engaged by tray progressing means such as the pawls described herein.

The motive power for reciprocating the shuttle bar and attached pawls may be other than the arrangement shown. The motion could come from an air cylinder, reciprocating solenoid, etc. The tray handling apparatus could also be tied into the operation of the component removing mechanism and hybrid circuit structure line as by connection of the wheel 64 to a shaft, or endless chain operated by those units. Most ideally all of the units taking part in the operation, i.e., the tray handling apparatus, the component pick-up mechanism, and the hybrid circuit structure line, would be operated off one main drive shaft by means of cams operative to time the operation of the various units in the proper sequence.

It is also to be understood that the system described herein may also function to store, transport and feed components to other than a component removal station. Any other type of mechanism for testing or treating components one at a time may be substituted for the component removal station and the claims set out hereafter should be so read. For example, a mechanism for applying a painted code number or even for applying an additional element to the components held in the tray may be located at the position A shown in the drawings. In such a case, the components are only treated at this stage and are not removed from the tray.

I claim:

1. A system for storage, transportation and feeding of electronic components consisting of the combination of a tray and tray handling apparatus, said tray being an elongated structure having component holding means spaced along one surface thereof, a series of teeth spaced along said tray in predetermined relationship with the component holding means on the tray, said tray handling apparatus consisting of an open-bottomed magazine for containing a stacked plurality of said trays, a track extending from said magazine to a component unloading station, a first rearwardly situated tray progressing means adjacent the magazine and operative to engage teeth on the tray to slidably actuate the lowermost tray out of the magazine and to progress the tray intermittently along the track in increments equal to the spacing between the components held on the tray, a second forwardly situated tray progressing means located between the magazine and the unloading station at less than a tray's length distance from the first tray progressing means, said second tray progressing means also operative to engage teeth on a tray for progressing said tray intermittently further along the track in increments equal to the spacing between the components held on the tray and to position said components seriatim at said unloading station, and drive means for operating said first and second tray tooth engaging means.

2. The system of claim 1 in which the second tray progressing means is adapted to engage a tooth on a tray prior to the engagement by the first tray progressing means of a tooth on a tray whereby the two tray progressing means will not bind when both are acting on a single tray.

3. Tray handling apparatus consisting of an open-bottomed magazine for containing a vertically stacked plurality of elongated trays having components spaced along the upper surface thereof in an equal progression with a series of downwardly depending ratchet teeth also spaced along the tray in a one-to-one relationship with the components held on the tray, a component removal station spaced apart from said magazine, a track for the slidable transport of said trays extending forwardly from said magazine opening to said component removal station, a first aperture in said track at a position adjacent the opening of the magazine to the track, a first rearwardly situated pawl extending through the aperture, a second aperture in said track at a position adjacent the component removal station, a second forwardly situated pawl extending through said second aperture, said first and second pawls being pivotally connected at spaced apart points on a shuttle bar and resiliently urged upwards to engage teeth on trays supported on said track, said shuttle bar adapted to reciprocate on an axis parallel to the track, first in a forward direction a distance equal to the progression between components on a tray, and then in a reverse direction a distance in slight excess of the progression, whereby in the forward motions of the shuttle bar the rearward pawl engages a tooth on the lowermost tray in the magazine and progresses said tray out of the magazine and along the track in increments equal to the progression between the components on the tray and the forward pawl engages a tooth on a tray and progresses said tray along the track in increments equal to the progression to position said components seriatim at the component removal station, and in the reverse motion of the shuttle bar the rearward and forward pawls are resiliently biased downwards to disengage from the tray teeth previously engaged and to slide rearward to a position for engaging succeeding teeth on the trays in the next forward motions, and tray detention means situated adjacent the first and second apertures for limiting the movement of the trays in any but a forward direction, and drive means for reciprocating the shuttle bar and attached first and second pawls.

4. The tray handling apparatus of claim 3 in which the first and second pawls are spaced apart on the shuttle bar a distance less than the length of a tray to be transported in the apparatus.

5. The tray handling apparatus of claim 3 in which first and second pawls are spaced apart a distance less than the length of a tray and equal to a whole number times the progression between the components on the tray plus a clearance factor less than a whole progression.

6. The tray handling apparatus of claim 3 in which the forward pawl is situated relative to the component removal station to engage in its forward motion the tray tooth corresponding to the component on the tray to be next positioned at the component removal station.

7. The tray handling apparatus of claim 3 in which the first pawl is situated adjacent to the opening from the magazine to the track whereby the first pawl in its forward motion engages and progresses the same tooth out of the magazine.

8. The tray handling apparatus of claim 3 in which the first pawl is situated in the magazine immediately adjacent the opening from the magazine to the track and the second pawl is situated relative to the component removal station to engage in its forward motion the tray tooth corresponding to the component on the tray to be next positioned at the component removal station, and the spacing between the first and second pawls is less than the length of a tray and equal to a whole number times the progression between components on a tray plus a clearance factor less than a whole progression.

9. The tray handling apparatus of claim 3 in which there is a pause after the completion of the forward motion of the shuttle bar and before the completion of its reverse motion whereby a component positioned at the component removal station at the end of the forward motion may be removed from the tray.

10. A component holding tray for use in a tray transporting apparatus which intermittently progresses an end-to-end line of such trays along a track with the components spaced apart at an equal progression, said tray consisting of an elongated structure having an upper, open-topped channel in one surface of the structure, a plurality of component holding means spaced apart along said upper channel in an equal progression, a plurality of teeth spaced along said tray in a one-to-one correspondence with the component holding means, the length of said tray being equal to the product of the number of component holding means on the tray times the progression spacing, minus a tolerance at each end of the tray whereby the length of the tray is less than a whole number times the progression.

11. A component holding tray consisting of an elongated structure having an upper, open-topped channel extending longitudinally in one surface of the structure, a component positioning member extending along the floor of the channel near one side wall thereof and having notches evenly spaced along its length for receiving the T-shaped leads of a row of components to be held in said upper channel with the cross-bar of the T-shaped lead confined in the space between the component positioning member and the adjacent side wall of the upper channel, and a lower, open-bottomed channel extending longitudinally in the opposite surface of the structure with the floor of the upper channel forming the roof of the lower channel, said lower channel having a width between its lowermost faces slightly greater than the width between the outer faces of the upper channel whereby a plurality of such trays may be stacked in a nesting position with the adjacent floor portions spaced apart to define a plurality of closed chambers between adjacent trays, and a plurality of teeth formed in at least one side wall of the lower channel, there being a one-to-one correspondence between the teeth in a side wall and the component holding notches.

12. The tray of claim 11 in which the teeth in the side wall of the lower channel each have a flat vertical face, and an at least partially slanted face opposite said vertical face.

13. The tray of claim 12 in which the angles formed by the slant and vertical faces of all the teeth on one side wall of the lower channel extend in the opposite direction to the angles formed by the slant and vertical faces of the teeth in the other side wall of the lower channel.

14. The tray of claim 11 in which the height of the two side walls defining the upper channel and the component positioning member are all equal.

15. The tray of claim 11 in which the roof of the lower channel is formed to close off the space between the component positioning member and the side wall of the upper channel nearest thereto when a plurality of trays are stacked one on another.

16. A system for storage, transportation and feeding of unsymmetrical electronic components into hybrid circuit substrates having predetermined printed metal land patterns thereon for receiving the leads of the component, said components having T-shaped anode leads extending from unencapsulated solid electrolytic capacitor bodies, said system consisting of the combination of elongated component handling trays having component holding means spaced along one surface thereof to hold a plurality of said components with the cross bars of the T-shaped leads all arranged in a line extending axially of the tray and near one side wall thereof, and a series of teeth spaced along the length of the tray in a one-to-one correspondence with the components held thereon; tray handling apparatus consisting of an open-bottomed magazine containing a stacked plurality of such trays, a track extending from said magazine to a component unloading station, tray progressing means operative to engage teeth on a tray to slidably actuate the lowermost tray out of the magazine and then to progress the tray intermittently along the track in increments equal to the spacing between the components held on the tray and to position said components seriatim at said unloading station; means for progressing a plurality of hybrid circuit substrates to position said substrates seriatim at an assembly station with the component receiving lands arranged in a predetermined orientation; and component transferring means for removing a component from a tray at the unloading station and for depositing said component onto the hybrid circuit substrate in synchronization with the positioning of said hybrid circuit substrate at the assembly station and with the T-shaped lead of the component on one land and the body of the component on another land.

17. The system of claim 16 in which the component holding trays are each provided with two sets of teeth, one set of teeth having a tooth structure for engagement with the tray progressing means in an opposite direction from that of the other set of teeth on the tray, whereby said trays may be disposed in said tray handling apparatus and progressed along the track thereof by engagement of the tray progressing means with the set of teeth on the tray corresponding to the desired orientation of the T-shaped lead at the component removal station.

18. The system of claim 16 in which electrical testing means are situated adjacent the track between the magazine opening and the component removal station for testing electrical characteristics of a component on the tray before it is positioned at the component removal station, means for instructing the component transfer means to divert and reject any components indicated to be defective when so tested, and means for interrupting the progression of the hybrid circuit substrates at the assembly station until the next non-defective component is positioned at the unloading station and transferred to the waiting substrate.

References Cited
UNITED STATES PATENTS

| | | | |
|---|---|---|---|
| 2,970,709 | 2/1961 | Gartner et al. | 214—301 |
| 3,180,505 | 4/1965 | Maurer | 214—310 |
| 3,308,977 | 3/1967 | Cochran et al. | 214—301 |
| 3,508,315 | 4/1970 | Hoffken | 29—203B |
| 3,526,029 | 9/1970 | Mesce et al. | 29—203B |

THOMAS H. EAGER, Primary Examiner

U.S. Cl. X.R.

214—301, 310